J. A. SMETHERS.
CASTER WHEEL TRUCK ATTACHMENT FOR CULTIVATORS, &c.
APPLICATION FILED AUG. 30, 1913.
1,106,742.
Patented Aug. 11, 1914.
2 SHEETS—SHEET 1.
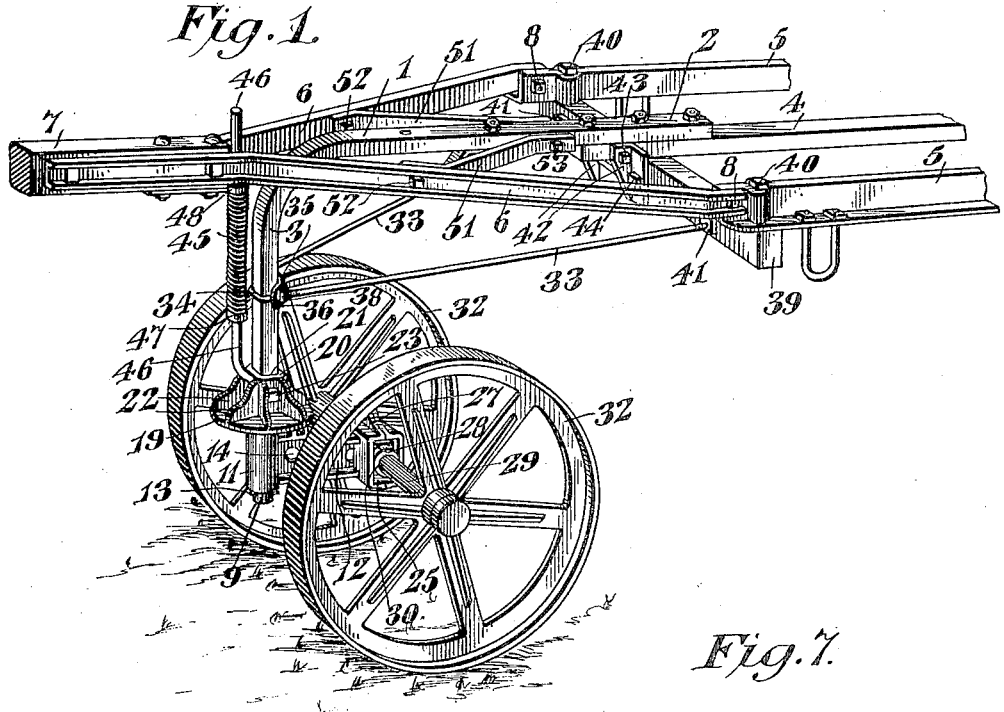
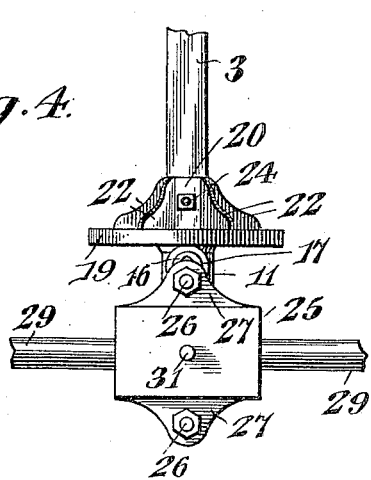
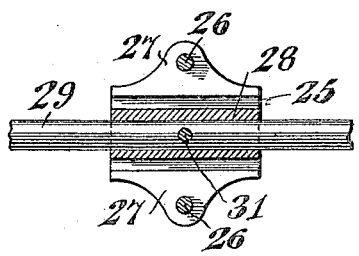
WITNESSES
James A. Smethers, INVENTOR
BY
ATTORNEY J. A. SMETHERS.
CASTER WHEEL TRUCK ATTACHMENT FOR CULTIVATORS, &c.
APPLICATION FILED AUG. 30, 1913.
1,106,742.
Patented Aug. 11, 1914.
2 SHEETS—SHEET 2.
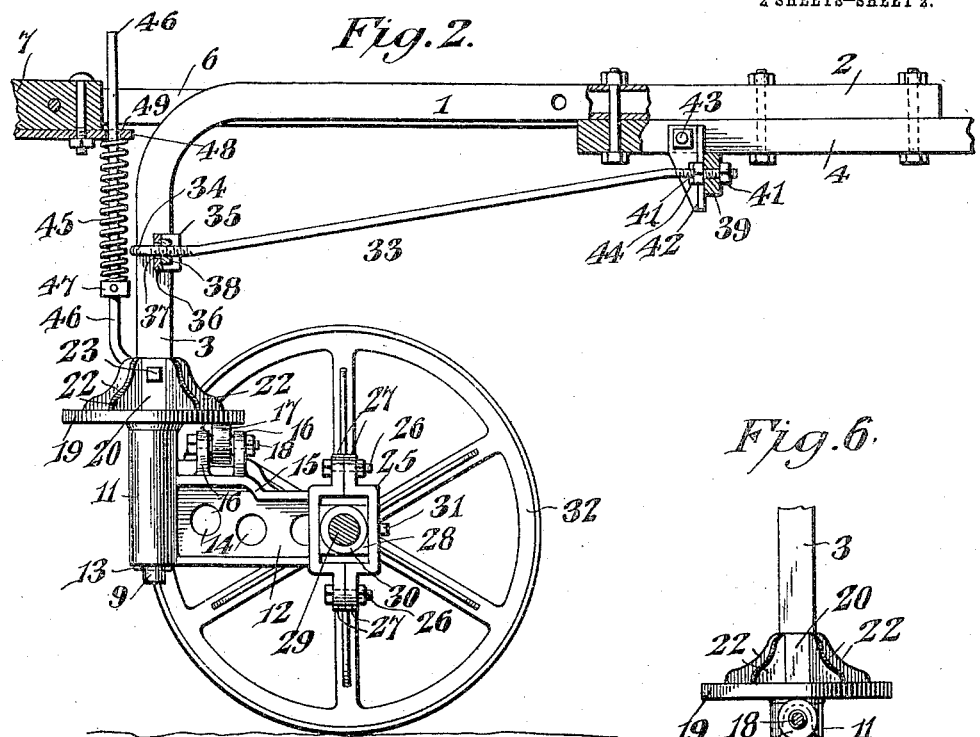
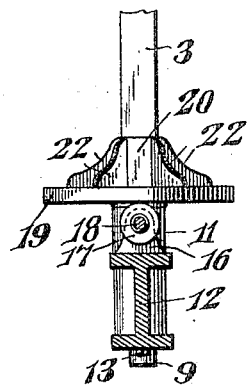
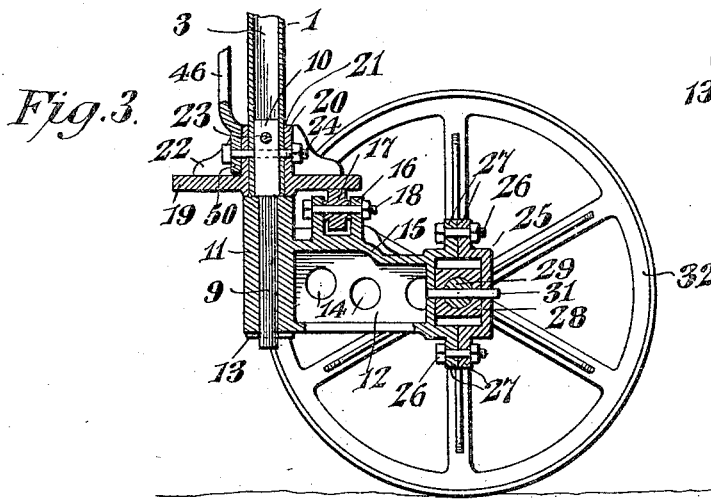
James A. Smethers, INVENTOR
WITNESSES
BY
ATTORNEY

UNITED STATES PATENT OFFICE.

JAMES A. SMETHERS, OF BEATRICE, NEBRASKA, ASSIGNOR TO THE BEATRICE IRON WORKS, OF BEATRICE, NEBRASKA.

CASTER-WHEEL TRUCK ATTACHMENT FOR CULTIVATORS, &c.

1,106,742.  Specification of Letters Patent.  Patented Aug. 11, 1914.

Application filed August 30, 1913. Serial No. 787,501.

*To all whom it may concern:*

Be it known that I, JAMES A. SMETHERS, a citizen of the United States, residing at Beatrice, in the county of Gage and State of Nebraska, have invented a new and useful Caster-Wheel Truck Attachment for Cultivators, &c., of which the following is a specification.

The invention relates to a caster wheel truck attachment for cultivators, etc.

The object of the present invention is to provide a simple, efficient and comparatively inexpensive caster wheel truck attachment of strong and durable construction, designed for use on cultivators, other implements and machines, wheeled vehicles and the like, adapted to be readily applied to the front portions of the main frame of the implement or machine, and equipped with a pair of caster wheels having a pivotally mounted axle, adapted to permit the wheels to raise and lower in following the contour of the ground.

Another object of the invention is to provide a truck attachment of this character equipped with means for yieldably supporting the tongue to relieve the necks of the draft animals of the weight of the same.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a caster wheel truck attachment, constructed in accordance with this invention. Fig. 2 is a central longitudinal sectional view of the same, the axle arm and the bearings thereof being shown in elevation. Fig. 3 is a vertical longitudinal sectional view through the axle arm, illustrating the manner of mounting the same and the axle. Fig. 4 is a rear elevation of the axle arm and the lower portion of the central bar. Fig. 5 is a transverse sectional view through the box of the axle arm. Fig. 6 is a transverse sectional view of the axle arm, illustrating the construction of the roller bearing. Fig. 7 is a detail perspective view of the pivotally mounted sleeve.

Like numerals of reference designate corresponding parts in all the figures of the drawings.

In the accompanying drawings in which is illustrated the preferred embodiment of the invention, 1 designates a central longitudinal bar or member designed to be constructed of tubular metal or any other suitable material and preferably rectangular in cross section, as shown. The central bar 1 is composed of an upper rearwardly extending horizontal portion 2 and a front depending vertical stem portion 3, and its rear portion is designed to be rigidly bolted or otherwise secured to the main frame or other part of a cultivator or other implement or wheeled vehicle. In the accompanying drawings the rear portion of the central bar is shown attached to a central longitudinal bar 4, designed to constitute a portion of the main frame of a two-row cultivator having side bars 5 constructed of angle metal or other suitable material and to which forwardly converging side braces 6 of the tongue 7 are pivoted by bolts 8 or other suitable fastening devices.

The front depending portion of the central bar 1 is provided at its lower end with a vertical pivot 9 having a squared shank 10 suitably secured within the lower end of the depending portion of the tubular bar 1, but the vertical pivot 9 may be applied to the central bar in any other suitable manner. The vertical pivot is arranged in a vertical tubular bearing portion 11 of an axle arm 12 and is secured to the same by a key 13, or other suitable fastening means piercing the lower end of the vertical pivot 9 and arranged at the lower edge of the tubular bearing 11. The tubular bearing 11 is arranged at and formed integral with the front end of the axle arm 12, which is approximately I-shaped in cross section, being composed of a central vertical web and horizontal top and bottom flanges extending from the opposite sides of the same. This construction provides a relatively light structure of maximum strength, and the arm is further lightened by openings 14 formed in the web portion of the arm. The arm 12 has a raised front portion 15 provided with upwardly projecting spaced transverse bearing lugs or ears 16 between which is mounted an antifriction roller 17. The roller is arranged on a bolt 18, which extends through the ears or lugs 16, and the vertical portion of the central bar is equipped with a horizontal bearing disk or plate 19, which rests upon the roller 17 to form a roller bearing to coöperate with the front vertical pivot 9. The horizontal bearing plate is provided with a central vertical sleeve 20 having a rectangular opening 21, which extends through the bearing plate and receives the lower end of the depending vertical front portion 3 of the central bar 1. The roller bearing is adapted to relieve the vertical pivot of lateral strain and facilitates an easy pivotal movement of the axle on the depending portion of the stem of the central bar. Although only one antifriction roller is shown in the accompanying drawings, yet any number may be employed for this purpose. The bearing plate 19 and the sleeve 20 are reinforced by radially disposed webs or flanges 22, and the sleeve is secured on the depending stem portion of the central bar 1 by bolts 23 and 24 or other suitable fastening means, which pierce the sleeve 20, the stem portion 3 of the central bar 1 and the shank 10 of the vertical pivot.

The central forwardly extending axle arm is equipped at its rear end with a transversely disposed sectional box 25 divided longitudinally, one of the sections being formed integral with the arm 12 and the other section being secured to the integral section by upper and lower bolts 26, which pierce abutting perforated ears or flanges 27 of the said sections. The ears or flanges 27 are arranged at the meeting edges of the sections of the box, which receives a pivotally mounted vertically tiltable sleeve 28. The sleeve, which has a central circular opening for the reception of a transverse caster axle 29, has a squared body portion and reduced cylindrical terminals 30, the body portion being pierced by a central horizontal pin 31, which passes through the axle and constitutes a pivot for the same and the sleeve 28. The flat front and rear vertical faces of the rectangular body portion of the sleeve fit against the inner vertical walls of the rectangular box 25, and the top and bottom faces of the sleeve 28 are spaced from the top and bottom walls of the box 25 when the said sleeve is in a horizontal position, as illustrated in Fig. 5 of the drawings, the space above and below the sleeve permitting a tilting movement of the axle on the pivot 31 to enable wheels 32 to rise and fall in following the contour of the ground. The wheels, which are located at opposite sides of the frame of the machine, are suitably secured to the ends of the caster axle and are adapted to rotate on the terminal spindle portions of the same. As the particular construction of the spindles or terminal portions of the axle and the means for securing the wheels thereon does not constitute a portion of the present invention, a detail illustration thereof is deemed unnecessary. The caster axle, which trails from the pivot of the stem of the central bar, is capable of free horizontal swinging movement on the vertical pivot 9 and free vertical pivotal movement on the horizontal pin or pivot 31 within the limits of the upper and lower walls of the sectional box.

The depending vertical stem portion 3 of the central bar 1 is braced by inclined rearwardly diverging rods 33, preferably constructed of a single piece of rod metal and connected at their front terminals by a bend 34, which partially embraces the stem 3. The bend 34 fits against the front portion of the stem 3, which is engaged by a transverse clamping plate 35, engaging the rear portion of the stem 3 and provided with terminal projecting portions 36, having openings 37 through which the bracing rods 33 pass. The front portions of the bracing rods may be threaded for the reception of nuts 38 for engaging the clamping plate, or any other suitable fastening means may be employed for this purpose.

The rear terminals of the bracing rods 33 pierce a transverse bar 39, extending across the front portion of the main frame and secured at its terminals to the front ends of the side bars 5 by vertical bolts 40. The ends of the transverse bar 39 are fitted against horizontal bottom flanges of the angle side bars 5 and the rear ends of the bracing rods 33 are preferably threaded for the reception of nuts 41, which engage the front and rear faces of the transverse bar 39, but the said rods 33 may be connected at their rear ends with the main frame in any other suitable manner. The transverse bar 39 is rigidly connected at its central portion with the front end of the central frame bar or member 4 by angle plates or brackets 42, arranged vertically and having their wings or flanges fitted against the side edges of the bar 4 and the front face of the bar 39 and secured to the said parts by bolts 43 and 44 or other suitable fastening means.

The forwardly converging side braces 6, which preferably consist of channeled bars, have their front terminal portions bolted or otherwise secured to the side faces of the tongue 7, and the latter is yieldably supported by a coiled spring 45, mounted on a vertical rod 46 and interposed between a set collar 47 of the rod and a plate 48, secured to the lower face of the rear terminal portion of the tongue and projecting rearwardly therefrom and provided with an eye or opening 49 through which the rod 46 slides. The set collar 47 is adjustable and the lower end of the rod 46 is provided with an attaching portion 50, rearwardly offset from the plane of the body portion of the rod by the bend and secured to the sleeve of the horizontal bearing plate or disk 19 by the bolt 24. The yieldable supporting device allows for an up and down movement of the tongue and is adapted to relieve the draft animals of the weight of the tongue. The side braces 6 are preferably connected at an intermediate point with the central bar 1 by supplemental rearwardly converging braces 51, having their front and rear terminal portions pivotally connected to the main braces and the central bar by bolts 52 and 53 or other suitable fastening means. The front ends of the supplemental braces are fitted against the inner faces of the side braces 6 and their rear ends are arranged at opposite sides of the horizontal portion of the central bar 1, as clearly shown in Fig. 1 of the drawings.

What is claimed is:—

1. A truck attachment of the class described including a central bar provided with an attaching portion and having a depending stem provided with a pivot, a central axle arm provided at its front portion with a bearing to receive the pivot and extending rearwardly therefrom, a transverse caster axle carried by the rear portion of the arm and located in rear of the pivot, and side wheels mounted on the axle.

2. The combination with a relatively fixed main frame, of an axle attachment including a central bar secured to the main frame and provided with a depending stem having a pivot, an axle arm provided at its front portion with a bearing to receive the vertical pivot and extending rearwardly therefrom, a transverse caster axle carried by the rear portion of the arm, side wheels mounted on the said axle, and a tongue having rearwardly extending braces located at opposite sides of the central bar and pivotally connected to the main frame.

3. The combination of a main frame including side bars, a tongue having rearwardly extending braces pivotally connected to the side bars, and a truck attachment comprising a central bar or member secured to the main frame and located between the said braces and provided with a depending stem having a pivot, an axle arm provided at its front portion with a bearing to receive the said pivot and extending rearwardly therefrom, a transverse caster axle carried by the rear portion of the said arm, and wheels mounted on the axle.

4. The combination of a main frame including side bars, a tongue having rearwardly extending braces pivotally connected to the side bars, and a truck attachment comprising a central bar or member secured to the main frame and located between the said braces and provided with a depending stem having a pivot, an axle arm provided at its front portion with a bearing to receive the said pivot and extending rearwardly therefrom, a transverse caster axle carried by the rear portion of the said arm, wheels mounted on the axle, and rearwardly converging supplemental braces extending from the side braces to the said central bar or member and pivotally connected to the same.

5. The combination of a main frame including side bars, a truck attachment comprising a central bar having a rearwardly extending horizontal portion rigidly secured to the frame, said central bar being also provided at the front with a depending stem having a pivot, a central axle arm provided at its front portion with a bearing to receive the said pivot and extending rearwardly therefrom, a transverse caster axle carried by the rear portion of the arm and side wheels mounted on the axle, a tongue located in advance of the central bar, and forwardly converging side braces located at opposite sides of the central bar and pivoted to the side bars of the main frame and rigidly connected at their front terminals to the tongue.

6. The combination of a main frame including side bars, a truck attachment comprising a central bar having a rearwardly extending horizontal portion rigidly secured to the frame, said central bar being also provided at the front with a depending stem having a pivot, a central axle arm provided at its front portion with a bearing to receive the said pivot and extending rearwardly therefrom, a transverse caster axle carried by the rear portion of the arm and side wheels mounted on the axle, a tongue located in advance of the central bar, forwardly converging side braces arranged at opposite sides of the central bar and pivoted to the side bars of the main frame and rigidly connected at their front terminals to the tongue, and a yieldable tongue support carried by the truck attachment at the front thereof and connected with the tongue between the same and the central bar.

7. The combination with a main frame, of a truck attachment comprising a central bar secured to the main frame and having a depending stem, an axle arm pivotally connected with and extending rearwardly from the stem, an axle carried by the arm, side wheels mounted on the axle, spaced brackets depending from the main frame, a transverse bar secured to the brackets and extending laterally therefrom, and bracing rods connected with the bar and extending to the said depending stem and secured to the same.

8. The combination with a main frame having a longitudinal bar, of a truck attachment including a central bar secured to the longitudinal bar and provided in advance of the same with a depending stem, an axle arm pivotally connected with the lower portion of the stem, a caster axle carried by the said arm, side wheels mounted on the axle, spaced depending brackets consisting of angle plates secured to the longitudinal bar of the main frame and having laterally projecting wings or flanges, a transverse bar secured to the said wings or flanges, and bracing rods extending from the transverse bar to the stem of the central bar and secured to the same.

9. The combination with a main frame, of a truck attachment including a central bar secured to the main frame and provided with a front depending stem, an axle arm pivotally connected with the stem, an axle carried by the arm, wheels mounted on the axle, forwardly converging bracing rods extending from the frame to the said stem and having a connecting bend arranged at the front of the stem, a clamping plate located at the back of the stem and having projecting portions provided with openings receiving the rod, and means carried by the rod for engaging the said plate.

10. A caster attachment including a depending stem having a pivot, an axle arm provided with a front bearing to receive the pivot and extending rearwardly therefrom, a horizontal bearing plate mounted on the stem above the arm, and an antifriction roller carried by the arm and bearing against the said plate.

11. A caster attachment including a depending stem having a pivot, an axle arm provided with a front bearing to receive the pivot and extending rearwardly therefrom, a horizontal bearing plate having a sleeve secured on the said stem, and an antifriction device carried by the axle arm and bearing against the underside of the said plate.

12. A truck attachment including a substantially vertical stem, a rearwardly extending axle arm pivotally connected with the vertical stem and having a horizontal swinging movement thereon, a caster axle located in rear of the stem and centrally pivoted to the rear portion of the said arm and arranged to swing upwardly and downwardly, and wheels mounted on the axle.

13. A truck attachment including a substantially vertical stem, an axle arm pivotally connected with the vertical stem and having a horizontal swinging movement thereon said arm extending rearwardly therefrom and provided at its rear end with a transverse box, an axle pivotally mounted within the box and arranged to swing upwardly and downwardly, and side wheels mounted on the ends of the axle.

14. A truck attachment including a substantially vertical stem, an axle arm pivotally connected with the stem and having a horizontal swinging movement thereon, said arms extending rearwardly therefrom and provided at its rear end with a transversely disposed box, a sleeve pivotally mounted in the box and arranged to swing upwardly and downwardly, an axle carried by the sleeve, and wheels mounted on the axle.

15. A truck attachment including a substantially vertical stem, an axle arm pivotally connected with the stem and having a horizontally swinging movement thereon, said arm extending rearwardly therefrom and provided at its rear end with a transversely disposed approximately rectangular box, a sleeve arranged in the box, and normally spaced from the top and bottom thereof, a caster axle extending through the sleeve, wheels mounted on the axle, and a central horizontal pivot mounted in the box and piercing the sleeve and the axle.

16. A truck attachment including a stem having a substantially vertical pivot, a rearwardly extending axle arm provided at the front with a vertical bearing to receive the pivot and having a horizontal swinging movement thereon, said arm also having a transversely disposed box at the rear portion, an axle pivotally mounted in the box and located in rear of the pivot and arranged to swing upwardly and downwardly, and side wheels arranged on the ends of the axle.

17. A truck attachment including a stem having a pivot, a rearwardly extending axle arm provided at the front with a vertical bearing to receive the pivot and having a transversely disposed box at the rear portion, an axle pivotally mounted in the box and arranged to swing upwardly and downwardly, side wheels arranged on the ends of the axle, a horizontal bearing plate secured to the stem above the tubular bearing portion of the arm, and a roller mounted upon the arm and bearing against the underside of the said plate.

18. The combination with a frame, a tongue pivotally connected therewith, a caster wheel attachment secured to the frame, a vertical rod mounted on the caster attachment at the rear end of the tongue, and a spring disposed on the rod and yieldably supporting the tongue.

19. The combination with a frame, a tongue pivotally connected therewith, a caster wheel attachment secured to the frame, a plate secured to the tongue and having an eye or opening, a vertical rod mounted on the caster attachment and extending through the eye or opening, and a spring disposed on the rod and fitting the eye and yieldably supporting the tongue.

In testimony, that I claim the foregoing as my own, I have hereto affixed my signature in the presence of two witnesses.

JAMES A. SMETHERS.

Witnesses:
  WALTER VASEY,
  AUGUST SCHAEFERT.